United States Patent
Linn (10) Patent No.: US 10,902,228 B2
(45) Date of Patent: Jan. 26, 2021

(54) PROCESSING MEAT BATCHES

(71) Applicant: Foss Analytical A/S, Hilleroed (DK)

(72) Inventor: Stefan Linn, Runkel (DE)

(73) Assignee: Foss Analytical A/S, Hilleroed (DK)

( * ) Notice: Subject to any disclaimer, the term of this patent is extended or adjusted under 35 U.S.C. 154(b) by 0 days.

(21) Appl. No.: 16/473,308

(22) PCT Filed: Jan. 10, 2017

(86) PCT No.: PCT/IB2017/050104
§ 371 (c)(1),
(2) Date: Jun. 25, 2019

(87) PCT Pub. No.: WO2018/130874
PCT Pub. Date: Jul. 19, 2018

(65) Prior Publication Data
US 2019/0370510 A1    Dec. 5, 2019

(51) Int. Cl.
*G06K 7/10* (2006.01)
*G06K 19/077* (2006.01)

(52) U.S. Cl.
CPC ... *G06K 7/10366* (2013.01); *G06K 19/07758* (2013.01)

(58) Field of Classification Search
CPC .................. G06K 7/10366; G06K 19/07758
USPC ....................................................... 235/375
See application file for complete search history.

(56) References Cited

U.S. PATENT DOCUMENTS

| 5,478,990 A * | 12/1995 | Montanari | ........... A22B 5/0064 235/375 |
| 2003/0170357 A1* | 9/2003 | Garwood | ............. B65D 81/268 426/392 |
| 2005/0084064 A1 | 4/2005 | McIntyre | |
| 2006/0043174 A1 | 3/2006 | Banavar et al. | |

(Continued)

FOREIGN PATENT DOCUMENTS

| RU | 2564060 C2 | 9/2015 |
| WO | WO-2011/138052 A1 | 11/2011 |

OTHER PUBLICATIONS

International Search Report (PCT/ISA/210) for PCT International Application No. PCT/IB2017/050104 completed Apr. 26, 2017.

(Continued)

*Primary Examiner* — Michael G Lee
*Assistant Examiner* — David Tardif
(74) *Attorney, Agent, or Firm* — Harness, Dickey & Pierce, P.L.C.

(57) ABSTRACT

A system for accepting or rejecting a container containing a meat batch comprises a reader and a controller cooperating to effect the acceptance or the rejection of the meat batch. The reader is configured to interrogate a machine readable tag attached to the container to retrieve information stored thereon into the controller which is configured to respond to the information retrieved by the reader to access batch information comprising at least information indicative of a fat content of the meat batch, to compare the batch information with a criterion of a recipe related to a target fat content to determine a suitability of the meat batch for inclusion in a mix meeting the recipe, and to generate a control signal dependent the determination usable to effect acceptance or rejection of the meat batch as appropriate to the determination.

18 Claims, 3 Drawing Sheets

(56) References Cited

U.S. PATENT DOCUMENTS

| | | |
|---|---|---|
| 2006/0113384 A1 | 6/2006 | Kurita et al. |
| 2007/0075833 A1 | 4/2007 | Hunt et al. |
| 2008/0003937 A1 | 1/2008 | Vote et al. |
| 2011/0054674 A1* | 3/2011 | Thorsson ............... B65G 47/46 700/230 |
| 2011/0062257 A1* | 3/2011 | Gould ...................... B07C 5/38 241/24.26 |
| 2014/0266612 A1 | 9/2014 | Marten et al. |
| 2015/0002260 A1* | 1/2015 | Brown .................... G06F 21/44 340/5.8 |
| 2015/0296813 A1 | 10/2015 | Gardarsson et al. |
| 2016/0321480 A1* | 11/2016 | Hamlin ................. G16H 10/40 |
| 2017/0228742 A1* | 8/2017 | Aljawhari .......... G06Q 30/0185 |

OTHER PUBLICATIONS

Written Opinion of the International Search Authority (PCT/ISA/237) for PCT International Application No. PCT/IB2017/050104 completed Apr. 26, 2017.

Russian Office Action dated Apr. 28, 2020 issued in corresponding Russian Appln. No. 2019115967/07(030377) and translation thereof.

* cited by examiner

PROCESSING MEAT BATCHES

CROSS-REFERENCE TO RELATED APPLICATIONS

This application is a National Stage of PCT/IB2017/050104, filed on Jan. 10, 2017, the entire contents of which are incorporated herein in their entirety.

BACKGROUND

The present invention relates to a method of and a system for accepting or rejecting meat batches for fabricating into a semi-finished or a finished product and in particular to a method of and system for accepting or rejecting meat batches for further processing into a consumer product.

During commercial meat processing, animal carcasses are fabricated into smaller meat portions including primal, sub-primal, trim, and fat portions, for example. Meat trim, which generally include lesser value meat cuts such as chucks, shanks, rounds, and sirloins, is commonly further processed for fabrication into burgers and sausages, and the like. The fat content has a significant impact on the value of the resulting product. The ratio of lean to fat is often referred to as the "lean point" of the meat trim and the ratio of fat to lean is often referred to as the "fat point".

Fat content information is employed in commercial meat processing in the grouping of these smaller portions, particularly those comprising the trim portions, into batches in which a target fat content of the batch and typically also at least a target weight is met.

Fat content information of the batch and optionally its target weight and possibly other batch related information is also employed later in commercial meat processing when selecting which batches, or portions thereof, with differing determined fat contents, are to be combined in order to achieve a blend that meets one or more desired criteria or a "recipe" for a particular semi-finished or finished product, such as bacon, minced meat, sausage or burgers. Such recipes typically contain a requirement for a desired fat (or lean) content, such as for example by stipulating, within predetermined limits, the lean point, the fat point, the percentage fat, the percentage meat or more generally, an indication of the fat content. These recipes often also contain other criteria to be met, such as criteria related to a desired weight and possibly anatomical or geographical origins of the meat portions to be used.

Typically the phase of commercial meat processing that involves grouping meat portions into batches ("grouping phase") and the phase that involves selecting batches to meet a recipe ("selecting phase") take place at different locations and are often performed by different parties. The information serving as an indication of the fat content of a batch is often generated during both the grouping and the selecting phases of commercial meat processing. This often results in an analyser for determining such information, at least for determining information indicative of a fat content, being located at each site where these phases take place.

It is known to measure individual portions of meat to obtain information indicative of a fat content of each portion by using an analyser having a measurement modality that employs a one of microwave, optical or x-ray radiation. One such analyser is the MeatMaster™, available from FOSS Analytical A/S, Hilleroed, Denmark. The MeatMaster employs dual x-ray energies in order to determine fat content information effectively in real time on meat portions as they are transported through an analysis zone of the analyser. Such analysers tend to be relatively expensive and bulky which often deters their inclusion in many process lines. This may be particularly true for process lines associated with the selecting phase.

Moreover, the analyser used to generate information indicative of the fat content of a batch during one phase of commercial meat processing may not employ the same measurement modality as the analyser used to generate information indicative of the fat content of a batch during a different phase of commercial meat processing. Even if analysers employing the same measurement modality are employed during these phases it may be that discrepancies arise between measurements made on the same batch at the different phases. This may perhaps be due to standardisation or calibration differences between the analysers.

SUMMARY

According to a first aspect of the present invention there is provided a method of accepting or rejecting a meat batch contained in a container, the container having linked thereto, via an attached machine readable tag, batch information related to the contained meat batch including at least information indicative of a fat content of the meat batch, the batch information retrievable through interrogation of the machine readable tag, the method comprising: interrogating the machine readable tag with an appropriate reader to access the batch information for use by a controller; comparing in the controller the accessed batch information with one or more target values; determining in the controller from the comparison an acceptance or a rejection of the meat batch for further processing; generating by the controller a control signal in dependence of the determination; and employing the control signal external of the controller to effect the acceptance or the rejection of the meat batch as appropriate to the determination.

Thus by controlling the selection of a meat batch using previously stored batch information related at least to a fat content which is directly linked to the contents of the container the need for a fat analyser for controlling the selection of meat portions is removed and measurement discrepancies may be avoided. Moreover, by arranging for the information to be obtained automatically human input error may be avoided.

In some embodiments the method may comprise the step of combining the accepted meat batch with one or more previously accepted meat batches to form a mix that meets the recipe.

In some embodiments the batch information may include other information, such as weight, supplier identification, type (for example: bovine, porcine etc.) and anatomical origin (for example: sirloin, shank etc.), which may or may not be specified in the recipe but which is employed in determining the acceptance or rejection of a meat batch.

In some embodiments the machine readable tag may, for example, be an electronic tag of a known type, such as a RFID chip or a near-field communication device, comprising an addressable memory holding the batch information or information providing a hyperlink or other electronic direction to the batch information stored on a remotely accessible storage device, such as on a server. The tag may alternatively contain similar information constituted in an optical machine readable representation as provided by a barcode, such as of the linear (e.g. EAN code) or of the matrix (e.g. QR™ code) type, attached to the container. The tag, electronic, optically readable or otherwise, may contain "hybrid"

batch information, that is, a portion of the batch information and an electronic direction to the remainder of the batch information.

In some embodiments the batch information may also include batch weight. Subsequently during the commercial meat processing the meat batch may be re-weighed and its weight at that time compared to that batch weight held as a part of the batch information. The results of this comparison may be employed as a simple confirmation or security check against tampering with the batch after information indicative of fat content has been established. This is possible as it has been found to be extremely difficult to replace individual meat portions of the meat batch with other meat portions, typically of greater fat content, and achieve exactly the same weight (to within a predetermined tolerance).

In some embodiments, the control signal may be employed in the automatic acceptance or rejection of a meat batch.

According to a second aspect of the present invention there is provided a system for accepting or rejecting a meat batch contained in a container having attached thereto a machine readable tag configured with information to provide access under interrogation to batch information comprising at least information indicative of a fat content of the meat batch, the system comprising: a reader configured to interrogate the machine readable tag attached to the container to retrieve information stored thereon; and a controller configured to respond to the information retrieved by the reader to access the batch information, to compare the batch information with a criterion of a recipe related to a target fat content to determine a suitability of the meat batch for inclusion in a mix meeting the recipe, and to generate a control signal dependent the determination usable to effect acceptance or rejection of the container as appropriate to the determination.

The system is thus configured to implement the methodology of the first aspect of the present invention and therefore has the advantages associated with the first aspect of the present invention.

BRIEF DESCRIPTION OF THE DRAWINGS

These and other advantages will be better appreciated through a consideration of the description of embodiments of the invention presented below and made with reference to the figures of the accompanying drawings, of which.

DETAILED DESCRIPTION

Figure 1:
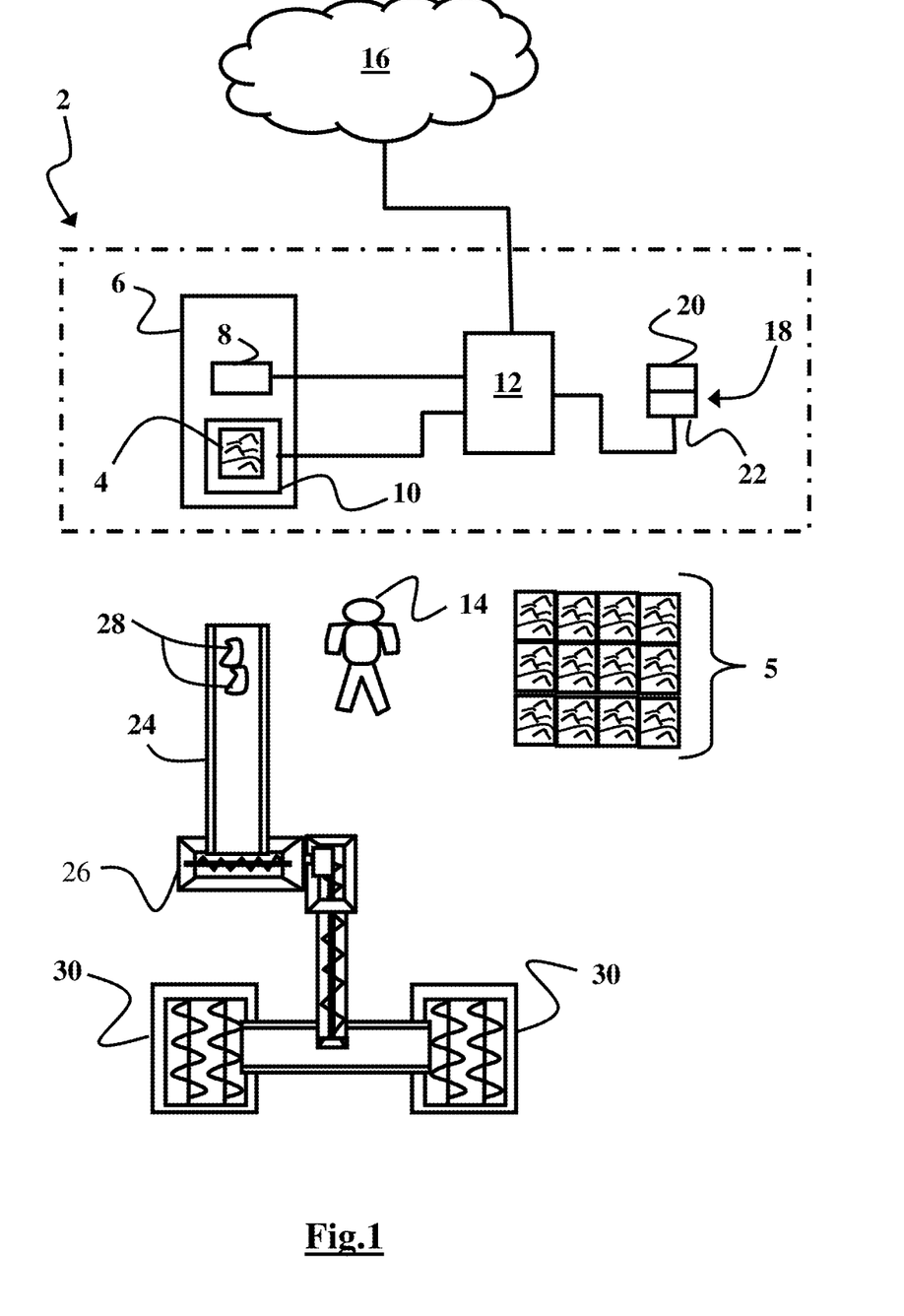
FIG. 1 Illustrates a first embodiment of a system according to the present invention.

A system 2 for selecting a meat batch for further processing is illustrated in FIG. 1. The system 2 is configured to determine for a meat batch in a container 4 of a plurality of meat batches in a plurality of containers 5 (here 12 containers are illustrated) whether or not some or all of a plurality of meat portions making up the meat batch in the container 4 is to be selected for combination with other selected meat batches from other containers 4 in the plurality of containers 5 to achieve a blend that will meet a predetermined set of one or more criteria (a 'recipe').

The system 2 comprises a scan station 6 comprising a reader 8 and in the present embodiment a weighing device 10. A controller 12 of the system 2 is operably connected to the scan station 6 to receive and process data from the reader 8 and from the optional weighing device 10. The controller 12 comprises a conventional data processor which is configured through suitable programming to perform certain data comparison and determination tasks as will be described below.

Each container 4 has affixed thereto a machine readable tag (not shown) by which there is associated batch information specific to each container 4. The batch information comprises information related to the meat batch contained in the container 4 and includes at least information indicative of a fat content of the meat batch. The batch information may also comprise other information necessary for the system 2 to make the selection and includes in the present embodiment weight information. In some embodiments the batch information may also include information selected from at least geographical and/or anatomical origin of the plurality of meat portions making up the batch; originator (supplier) of the batch; status of an analyser generating the information indicative of the fat content of the meat batch; and time and/or date the batch was made.

The reader 8 is configured to interrogate the machine readable tag affixed to a specific container 4 of the plurality of containers 5 when the specific container 4 is located, in the present embodiment manually located by an operator 14, at the scan station 6.

In the present embodiment the reader 8 is an optical bar code reader and the machine readable tag is a bar code containing information retrievable upon interrogation by the reader 8 which provides a hyperlink or other electronic direction to the associated batch information. This associated batch information is, in the present embodiment, stored remotely in an electronically accessible database 16. The reader 8 is configured to transmit this electronic direction information to the controller 12. The controller 12 here also comprises a communications module operable in response to the electronic direction information to establish contact with the remote database 16 in which the associated batch information is stored and to retrieve this associated batch information into an addressable memory portion of the controller 12 in which it is temporarily stored. In the present embodiment the batch information comprises at least information indicative of a fat content of the meat batch in the specific container 4 and its weight.

The weighing device 10 is configured to weigh the container 4 located at the scan station 6 and to transmit weight information indicative of the measured weight to the controller 12. In the present embodiment the controller 12 is configured to determine a difference between this transmitted weight information and the weight information retrieved into its addressable memory portion as a part of the associated batch information and to issue a control signal for use in accepting or rejecting the meat batch dependent on whether the difference exceeds a predetermined level (rejection).

The controller 12 of the present embodiment is further configured to compare the part of the associated batch information which is the information indicative of the fat content of the meat batch in the container 4 at the scan station 6 with a desired fat content of a recipe held accessible to the controller 12, for example permanently or temporarily stored in the addressable memory portion. This comparison is done to determine whether or not the fat content of the meat batch is suitable for its selection. In some embodiments the recipe comprises a number of other criteria to be met by a meat batch before it is selected for combining with other selected meat batches. The controller 12 is configured to access appropriate batch information which has been retrieved into its addressable memory portion and to determine, for each criterion of the recipe, whether or not that criterion is met by the meat batch.

The controller 12 issues a control signal for use in accepting the meat batch only if all criteria are met (and optionally, as in the present embodiment, the determined weight difference is acceptable). Usefully, the controller 12 is configured to make the determinations serially and to stop upon the first occasion of a criterion not being met. At this time the controller 12 issues a control signal for use in rejecting the meat batch. In some embodiments, acceptance or rejection of the meat batch also depends on criteria not related to the recipe, such as on batch information related to a state of an analyser used to originate the information indicative of a fat content of the meat batch.

In the present embodiment the system 2 further comprises a sensory indicator 18, such as an audible or visual signal generator, responsive to the control signal from the controller 12. In the present embodiment the sensory indicator 18 comprises selectably energisable red 20 and green 22 lights. The red light 20 when energised provides a human discernible signal to prompt the rejection of the meat batch in the specific container 4 at the scan station 6 and the green light 22 when energised provides a human discernible signal to prompt acceptance of the meat batch in the container 4 at the scan station 6.

The operator 14 responds to the lights 20, 22 to either remove the container 4 from further processing (red light 20 energised) or to place the contents of the container 4 (or the container 4 including its contents) at a location for further processing, from which location the meat portions of the selected meat batch will be combined with other meat portions from other selected meat batches to form into mix having criteria that meet the recipe. By way of example, as illustrated in the present embodiment, the selected meat portions 28 are placed on an in-feed conveyor 24 of a grinder 26 which in turn feeds ground meat into mixers 30.

Figure 2:
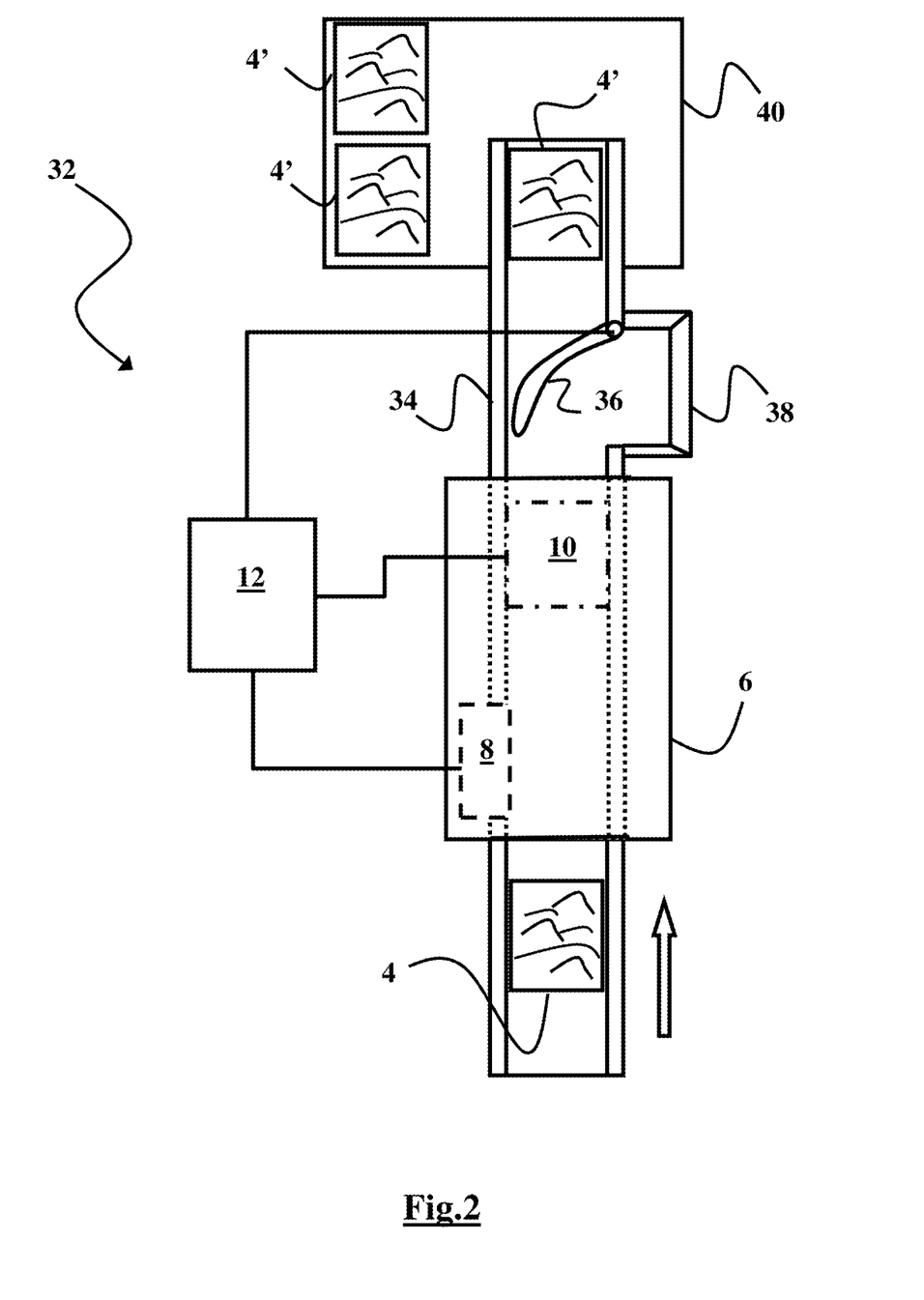
FIG. 2 Illustrates a second embodiment of a system according to the present invention.

A second embodiment of a system 32 according to the present invention is illustrated in FIG. 2. In common with the system 2 illustrated in FIG. 1 and described above, the system 32 comprises a scan station 6 which includes a reader 8 and weighing device 10; and a controller 12 connected to receive data from the scan station 6 and configured to issue a control signal substantially in the manner as described with respect to the system 2 of FIG. 1.

Different to the system 2 of FIG. 1, the system 32 of the present embodiment is configured with a reader 8 for reading batch information which is stored entirely on an electronic machine readable tag such as an RFID chip and associated memory. Therefore the controller 12 need not be configured for telecommunication with a remotely stored database in order to retrieve some or all of the batch information.

The system 32 additionally comprises a transport, such as an endless belt conveyor 34, configured to transport containers 4 holding meat batches through the scan station 6 in the direction of the arrows and over the weighing device 10, which here is a conventional mechanical or piezo-type device, located under an upper portion of the endless belt conveyor 34. The system 32 is also provided with an automatic selector, here comprising at least one deflector arm 36 which is hinged alongside the conveyor 34 downstream the scan station 6 in the direction of movement of the container 4. The deflector arm 36 is operable under control of the control signal issued by controller 12 to move to lie at an angle across the conveyor 34 (as illustrated in FIG. 2) to selectively divert containers 4 away from further processing, for example into a waste bin 38. Alternatively, the deflector arm 36 may, in this position, selectively divert containers 4 towards further processing.

In the present embodiment, the deflector arm 36 is also moveable in response to the appropriate control signal to permit passage of selected containers 4' towards a collection station 40 from where its contents will be combined with the contents of other so selected containers to achieve a blend that meets a desired recipe. For example, the selected container 4' may be transported from the conveyor 34 of the system 32 and onto a pallet 42 located at the collection station 40. Selected containers 4' are stored on the pallet 42 until sufficient meat portions are collected to meet a desired recipe. The pallet 42 may then be transported for further processing, such as by means of the grinder 26/mixer 30 combination illustrated in FIG. 1, to achieve a mix meeting the desired recipe. This further processing may be performed at a different geographical location (at a consumer product fabrication plant, for example) to the one where the system 32 is installed (at a logistics centre or automated warehouse, for example) In some embodiments the selected container 4' may be transported directly to an in-feed conveyor 24 which feeds meat portions 28 from the meat batch of the selected container 4' into such a grinder 26.

Thus, in contrast to the system 2 of FIG. 1, the present system 32 provides for the automatic selection and transportation of containers 4' from a plurality of containers 4 for further processing of their contents to form a mix which meets a desired recipe.

The controller 12, the reader 8 elements of the systems 2;32 described above are described as single units but it will be appreciated that these elements may be realised by a plurality of units, each unit of which provides a part of the functionality attributed to the relevant element but some or all of which together provide the whole functionality of that element, without departing from the invention as claimed.

Figure 3:
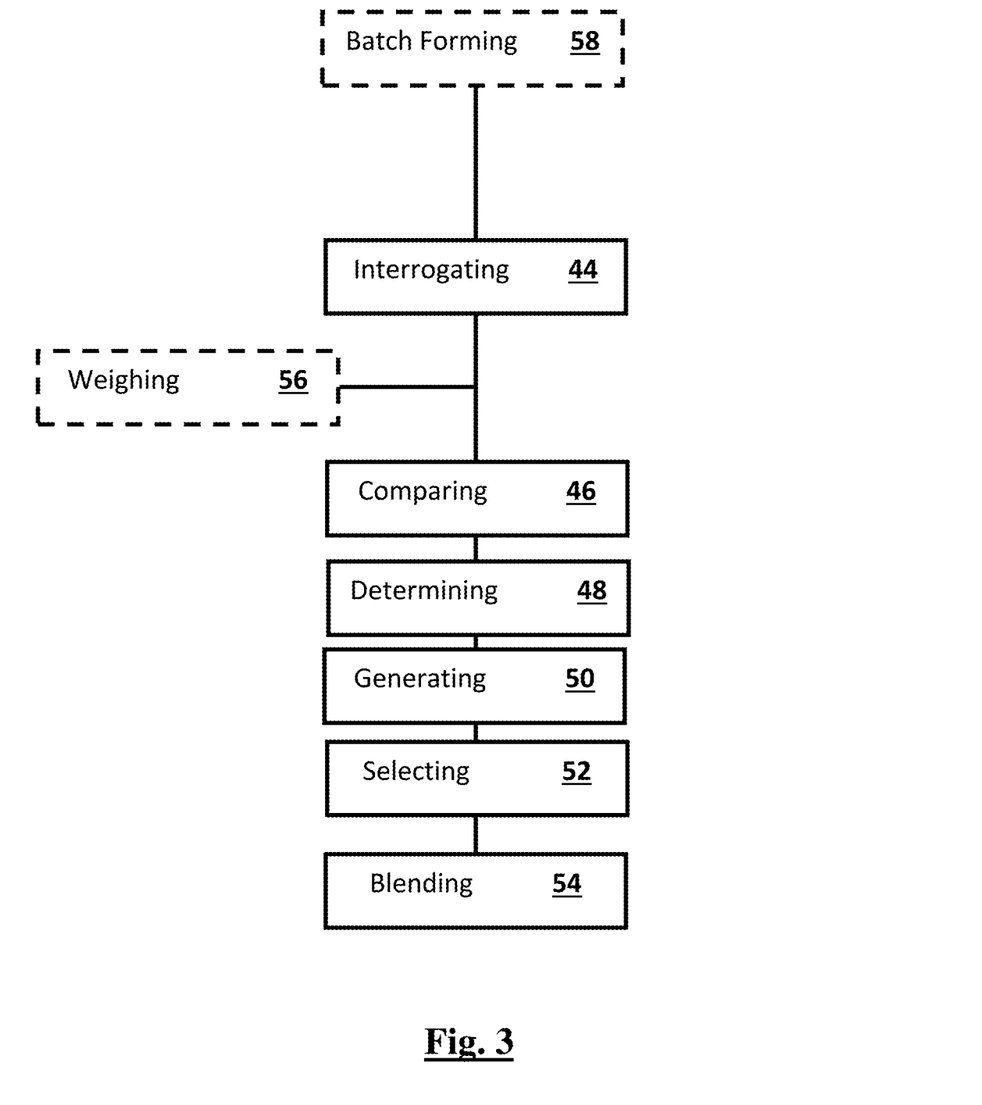
FIG. 3 Illustrates exemplary methodology according to the present invention.

As will also be appreciated from the foregoing descriptions of the embodiments of systems 2;32 for selecting a meat batch the system according to the present invention generally operates according to the following exemplary methodology of the present invention which is described with reference to the flow chart of FIG. 3.

At an interrogating step 44 a machine readable tag located on a container is interrogated by an appropriate reader in order to retrieve batch information related to the meat batch contained in the container.

Batch information comprises at least information indicative of a fat content of the meat batch but could also include other information such as information related to one or more of, its weight, its geographical origin, its anatomical origin, the identity of the supplier of the meat batch, status of an analyser employed in determining information indicative of a fat content, and temporal information related to the time of batch formation.

In some embodiments the batch information may be stored entirely on the machine readable tag to be retrieved directly by the reader. In other embodiments the batch information may be stored in a remote, electronically accessible database. In this case the interrogation of the machine readable tag will provide a hyperlink or other electronic direction via which the appropriate batch information in the database may be accessed. It is also envisaged that the machine readable tag may provide a combination of the two, i.e. some batch information is stored on the machine readable tag and some of the batch information is accessible via a remote database, directions to which are stored on the machine readable tag to be retrieved by the reader when interrogated.

At a comparing step 46 the retrieved batch information is compared in a data processor with desired target values of the batch information, at least in relation to the information indicative of a desired fat content to determine (determining step 48) whether the meat batch is to be accepted or rejected and a control signal is generated (generating step 50) dependent on the determination at step 48.

At this comparison step 46 the data processor is provided with access to a desired recipe that comprises one or more criteria to be met by a combination of meat batches. The data processor of the controller 12 operates to compare the batch information with the appropriate recipe criteria to determine (step 48) whether or not to accept or reject the meat batch for inclusion in a mix with other selected meat batches to meet the recipe.

In some embodiments the criteria are fat content and total weight of a mix. The comparison step 46 then includes operating the data processor to compare retrieved batch information indicating the fat content of the batch with the fat content criterion to determine, according to some embodiments, whether or not the fat content of the batch is equal to (within preset limits) the fat content set by the fat content criterion. In case positive then a control signal may be generated (step 50) for use in accepting the meat batch. It may be that in other embodiments the data processor has access to fat content information of previously accepted meat batches and is configured to use this information together with the information indicating fat content of the present meat batch to determine whether an average fat content would be met which is equal to the fat content set by the fat content criterion.

In these embodiments, where a total weight criterion is also to be met, the retrieved batch information indicating the weight of the meat batch is compared at this step 46 with the total weight criterion to determine (step 48) whether acceptance of the batch would result in a mix having a total weight in excess of that related to the total weight criterion. In case positive then a control signal may be generated (step 50) for use in rejecting the meat batch.

Generally, where several criteria must be met in order for a mix to meet a recipe, then not until it is determined (step 48) for all criteria that the recipe would be met if the meat batch were to be accepted is a control signal generated (step 50) for use in accepting the meat batch, otherwise a control signal for use in rejecting the meat batch will be generated (step 50). Usefully the data processor may operate to continue to make comparisons (step 46) and determinations (step 48) related to the different recipe criteria only until a determination (step 48) is made rejecting the batch, at which time the data processor generates a control signal for use in rejecting the batch (step 50).

At a selecting step 52 the control signal generated at the generating step 50 is employed to accept or reject the meat batch in the container as appropriate to the determination made at that determining step 48.

This selecting step 52 may be manual and the control signal employed to generate sensory signal, such as an audible and/or visible signal, to direct an operator to either accept or reject the meat batch in the container dependent on the control signal. In such case the control signal may be formed to energise a red light, for example, to indicate that the meat batch is to be rejected and to energise a green light, for example, to indicate that the meat batch is to be accepted.

In some embodiments the selecting step 52 may be automated to achieve selection of an accepted meat batch without human intervention. This may be done for example by having a selector which is operated in response to the control signal generated at the generating step 50 to selectively divert a container away from or towards previously selected containers or their contents, as appropriate to the determination made at the determining step 48.

At a blending step 54 the meat batch accepted at the selecting step 52 is blended with other similarly accepted meat batches to achieve a mix which meets the criteria of the recipe. Blending may be done by first grinding the meat batches in a conventional grinder and then feeding the resulting ground meat to conventional mixing apparatus.

Optionally a weighing step 56 may be included at which batch weight information related to the weight of the meat batch is generated. This may be achieved simply by weighing the container and its contents.

In some embodiments the batch weight information is employed by the data processor of the controller in the comparison step 46 to make a determination at the determining step 48 related to a desired weight criterion of the recipe.

In the same or other embodiments the batch weight information may be employed by the data processor in the comparison of this batch weight information with weight information included in the batch information. Here the data processor is configured to determine whether the weights are equal (within preset tolerances) and in the case negative to generate a control signal for use in rejecting the meat batch. In the case negative no further determinations may be made and the meat batch rejected directly. This determination may this serve as a check against tampering with the meat batch after its formation since any attempt to substitute portions of the meat batch with more fatty portions most probably will result in a measurable weight change to the batch. Usefully, but not essentially, this determination may be the first determination made since, in the case negative, the batch will always be rejected.

Optionally a batch forming step 58 may be included to be performed before the interrogating step 44. The batch forming step 54 comprises determining an indication of the fat content of a plurality of meat portions using an analyser; grouping the plurality of meat portions in dependence of the determined indication of fat content into one or more batches each with a desired fat content; placing each of the one or more meat batches into an own container of one or more containers; for each of the one or more meat batches, linking at least the determined indication of the fat content to the own container as the batch information; and supplying the one or more containers for interrogation.

In some embodiments the batch information generated at this batch forming step 54 may include information regarding the status of the analyser performing the determination of fat content. Here, the batch information may include information such as information identifying when the analyser was last calibrated using reference standards, for example plastic phantoms for x-ray based analysers, or the version of the calibration employed in determining the indication of fat content from the measured x-ray interactions with the meat portion. In some embodiments this information may be added by an independent third party tasked with monitoring and verifying the performance of the analyser.

In a further embodiment of a system according to the present invention as will be described, by way of example only, with reference to the elements of system 2 of FIG. 1 modified in accordance with the following. The controller 12 is modified simply to record batch information indicative of the fat content of a meat batch in a container 4 at the scan station 6 which is obtained via the reader 8. A weight of the meat batch is also obtained into the controller 12 by one or both corresponding information of the batch information and direct measurement using the optional weighing device 10. The meat batch, either alone or contained in the container 4 is then passed, for example using an in-feed conveyor 24, to a hopper, pallet, combination bin or other holder, until a target weight is met as determined from a comparison of the cumulative weights of each container 4 at the scan station 6 with the target weight. Thus, larger meat batches may be formed for subsequent use in the formation of semi-finished or finished consumer products.

In this further embodiment the controller 12 is further modified to determine an indication of an average fat ratio from the weights and the fat ratios of the individual meat batches and to provide an output signal indicative of at least the average fat ratio of the contents of the holder. This output signal may be used in a writer (not shown) of known type configured to write batch information, including information related to the fat ratio and typically also the weight of the meat batches in the holder, to be accessed when the machine readable tag of a container is read. Some or all of this batch information may be encoded onto the machine readable tag itself by the writer or may be placed in a remotely accessible database to be accessed when electronic directions, written to the tag by the writer.

It is envisaged that this batch information is to be accessed later during commercial meat processing by systems substantially as described with respect to the embodiments depicted in FIG. 1 or FIG. 2 and employed as described with respect thereto to create a blend according to a recipe.

The invention claimed is:

1. A method of accepting or rejecting a meat batch contained in a container, the method comprising:
   interrogating a machine readable tag attached to the container with an appropriate reader to access batch information associated with the attached machine readable tag, the batch information related to the meat batch, the batch information being previously stored prior to the interrogating, the batch information including at least information indicative of a fat content of the meat batch;
   comparing, in a controller, the accessed batch information with one or more criteria, the one or more criteria accessible by the controller independently of direct analysis of the meat batch or the container;
   determining, in the controller, an acceptance or a rejection of the meat batch for further processing based on the comparison;
   generating, by the controller, a control signal based on the determination; and
   transmitting the control signal from the controller to cause the meat batch to be selectively accepted or rejected as appropriate to the determination.

2. The method of claim 1, wherein the one or more criteria are included in a recipe accessible to the controller and are related to a target fat content.

3. The method of claim 1, wherein transmitting the control signal includes transmitting the control signal as an input to a selector to cause the selector to selectively interact physically with the container to cause the meat batch to be accepted or rejected.

4. The method of claim 2, wherein the determining includes determining whether or not the fat content of the meat batch renders the meat batch suitable for inclusion in a mix with one or more other previously selected meat batches to cause the mix to meet the target fat content.

5. The method of claim 4, wherein
   the determining includes accepting the meat batch for further processing based on a determination that the fat content of the meat batch renders the meat batch suitable for inclusion of the meat batch in the mix, so that the mix meets the target fat content,
   the transmitting causes the meat batch to be accepted, and
   the method further includes blending the accepted meat batch with one or more previously accepted meat batches to form the mix.

6. The method of claim 4, wherein
   the recipe includes a plurality of further criteria to be met for acceptance of the meat batch, and
   the method further includes comparing some or all criteria of the plurality of further criteria with some or all of information including the batch information to determine whether or not the meat batch is suitable for inclusion in the mix.

7. The method of claim 2, further comprising:
   determining in an analyser an indication of separate, respective fat contents of a plurality of meat portions;
   grouping the plurality of meat portions, based on the determined indications of separate respective fat contents of the plurality of meat portions, into one or more meat batches, the one or more meat batches including the meat batch, each meat batch associated with a separate desired fat content;
   placing each meat batch of the one or more meat batches into an own container, the own container in which the meat batch is placed being the container;
   for each given meat batch of the one or more meat batches, linking at least the determined indication of the fat content of the given meat batch to the own container in which the given meat batch is contained as batch information associated with the given meat batch; and
   supplying the container for interrogation.

8. The method claim 1, further comprising:
   weighing the meat batch to obtain batch weight information;
   comparing the batch weight information with retrieved batch information indicative of a weight of the batch at a time of formation of the meat batch to obtain a value of a difference between the batch weight information and the retrieved batch information; and
   generating the control signal to cause the meat batch to be selectively rejected or accepted based on whether the value of the difference exceeds or does not exceed a target level, respectively.

9. A system for accepting or rejecting a meat batch contained in a container, the system comprising:
   a reader configured to interrogate a machine readable tag attached to the container to retrieve information stored on the machine readable tag; and
   a controller including a data processor configured to execute programming to
      respond to the information retrieved by the reader to access batch information based on a determination that the batch information is associated with the information retrieved by the reader, the batch information being previously stored prior to the interrogating, the batch information including at least information indicative of a fat content of the meat batch, to compare the batch information with a criterion of a recipe related to a target fat content to determine a suitability of the meat batch for inclusion in a mix meeting the recipe, the recipe accessible by the controller independently of direct analysis of the meat batch or the container, and generate a control signal based on the determined suitability to cause the container to be selectively included in the mix or excluded from the mix.

10. The system of claim 9, further comprising:
a weighing device configured to supply weight information to the controller.

11. The system of claim 9, further comprising:
a selector configured to interact physically with the container in response to the control signal to selectively physically divert the container to cause the meat batch to be selectively included in the mix or excluded from the mix.

12. The system of claim 9, further comprising:
the container containing the meat batch, the container including the machine readable tag affixable to the container, the machine readable tag configured to retain the information accessible under interrogation by the reader and associated with the batch information, the batch information including at least the information indicative of the fat content of the meat batch.

13. The system of claim 9, the data processor further configured to execute the programming to
accept the meat batch for further processing based on a determination that the fat content of the meat batch renders the meat batch suitable for inclusion of the meat batch in the mix, so that the mix meets the target fat content,
wherein the generating the control signal causes the meat batch to be blended with one or more previously accepted meat batches to form the mix.

14. The system of claim 9, wherein
the recipe includes a plurality of further criteria to be met for acceptance of the meat batch, and
the data processor is further configured to execute the programming to compare some or all criteria of the plurality of further criteria with some or all of information including the batch information to determine whether or not the meat batch is suitable for inclusion in the mix.

15. A system for accepting or rejecting a meat batch, the system comprising:
a reader configured to interrogate a machine readable tag to retrieve information, the information associated with batch information, the batch information being previously stored prior to the interrogating, the batch information including at least information indicative of a fat content of the meat batch, the machine readable tag being attached to a container in which the meat batch is contained; and a controller including a data processor configured to execute programming to
respond to the information retrieved by the reader to access batch information based on a determination that the batch information is associated with the information retrieved by the reader,
compare the batch information with a criterion of a recipe related to a target fat content and to determine a suitability of the meat batch for inclusion in a mix meeting the recipe, the recipe accessible by the controller independently of direct analysis of the meat batch or the container, and
generate a control signal based on the determined suitability to cause the meat batch to be selectively included in the mix or excluded from the mix.

16. The system of claim 15, further comprising:
a selector configured to interact physically with the container in response to the control signal to selectively physically divert the container to cause the meat batch to be selectively included in the mix or excluded from the mix.

17. The system of claim 15, the data processor further configured to execute the programming to
accept the meat batch for further processing based on a determination that the fat content of the meat batch renders the meat batch suitable for inclusion of the meat batch in the mix, so that the mix meets the target fat content,
wherein the generating the control signal causes the meat batch to be blended with one or more previously accepted meat batches to form the mix.

18. The system of claim 15, wherein
the recipe includes a plurality of further criteria to be met for acceptance of the meat batch, and
the data processor is further configured to execute the programming to compare some or all criteria of the plurality of further criteria with some or all of information including the batch information to determine whether or not the meat batch is suitable for inclusion in the mix.

* * * * *